(12) United States Patent
Wang et al.

(10) Patent No.: US 8,793,130 B2
(45) Date of Patent: *Jul. 29, 2014

(54) CONFIDENCE MEASURE GENERATION FOR SPEECH RELATED SEARCHING

(75) Inventors: Ye-Yi Wang, Redmond, WA (US); Yun-Cheng Ju, Bellevue, WA (US); Dong Yu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 173 days.

This patent is subject to a terminal disclaimer.

(21) Appl. No.: 13/428,917

(22) Filed: Mar. 23, 2012

(65) Prior Publication Data

US 2012/0185252 A1    Jul. 19, 2012

Related U.S. Application Data

(62) Division of application No. 11/888,928, filed on Aug. 3, 2007, now Pat. No. 8,165,877.

(51) Int. Cl.
*G10L 15/00* (2013.01)
(52) U.S. Cl.
USPC ........... 704/240; 704/7; 704/9; 704/246; 704/247; 704/251
(58) Field of Classification Search
None
See application file for complete search history.

(56) References Cited

U.S. PATENT DOCUMENTS

| | | | |
|---|---|---|---|
| 5,566,272 A | 10/1996 | Brems et al. | |
| 5,644,680 A | 7/1997 | Bielby et al. | |
| 6,141,641 A * | 10/2000 | Hwang et al. | 704/243 |
| 6,374,219 B1 * | 4/2002 | Jiang | 704/255 |
| 6,421,640 B1 | 7/2002 | Dolfing et al. | |
| 6,567,805 B1 | 5/2003 | Johnson et al. | |
| 7,092,883 B1 | 8/2006 | Gretter et al. | |
| 7,912,699 B1 * | 3/2011 | Saraclar et al. | 704/9 |
| 2004/0015365 A1 | 1/2004 | Ohmori et al. | |
| 2005/0049852 A1 | 3/2005 | Chao | |
| 2005/0055209 A1 | 3/2005 | Epstein et al. | |
| 2006/0069564 A1 * | 3/2006 | Allison et al. | 704/257 |
| 2006/0074655 A1 * | 4/2006 | Bejar et al. | 704/243 |
| 2006/0111909 A1 | 5/2006 | Maes et al. | |
| 2006/0143007 A1 | 6/2006 | Koh et al. | |
| 2006/0271364 A1 | 11/2006 | Mirkovic et al. | |
| 2007/0213982 A1 * | 9/2007 | Xi et al. | 704/243 |
| 2008/0270138 A1 * | 10/2008 | Knight et al. | 704/260 |
| 2008/0270344 A1 * | 10/2008 | Yurick et al. | 707/2 |
| 2009/0037175 A1 | 2/2009 | Wang et al. | |

OTHER PUBLICATIONS

Sarikaya, Ruhi et al., "Word Level Confidence Measurement Using Semantic Features," pp. 604-607, ICASSP 2003.
Sarikaya, Ruhi et al., "Semantic Confidence Measurement for Spoken Dialog Systems," IEEE, vol. 13, No. 4, Jul. 2005, pp. 534-545.
Gu, Liang et al., "Concept-Based Speech-to-Speech Translation Using Maximum Entropy Models for Statistical Natural Concept Generation," pp. 377-392, IEEE vol. 14, No. 2, Mar. 2006.
Culotta, Aron et al., "Confidence Estimation for Information Extraction," Department of Computer Science, University of Massachusetts, 4 pages.
Prosecution documents for U.S. Appl. No. 11/888,928.

* cited by examiner

*Primary Examiner* — Leonard Saint Cyr
(74) *Attorney, Agent, or Firm* — Steve Wight; Carole Boelitz; Micky Minhas

(57) ABSTRACT

A method of generating a confidence measure generator is provided for use in a voice search system, the voice search system including voice search components comprising a speech recognition system, a dialog manager and a search system. The method includes selecting voice search features, from a plurality of the voice search components, to be considered by the confidence measure generator in generating a voice search confidence measure. The method includes training a model, using a computer processor, to generate the voice search confidence measure based on selected voice search features.

20 Claims, 7 Drawing Sheets

CONFIDENCE MEASURE GENERATION FOR SPEECH RELATED SEARCHING

CROSS-REFERENCE TO RELATED APPLICATION(S)

The present application is a divisional of and claims priority of U.S. patent application Ser. No. 11/888,928, filed Aug. 3, 2007, the content of which is hereby incorporated by reference in its entirety.

BACKGROUND

In spoken dialog systems, a computer system equipped with an automatic speech recognizer attempts to understand and interpret a spoken utterance input by a user. A dialog manager component determines an appropriate conversation strategy based on the user's input and controls the flow of the conversation with the user.

In such systems, a confidence measure refers to an indication of the system's level of uncertainty in its interpretations of a user's utterance. The confidence measure is an important component of a spoken dialog system in that the dialog manager relies on it to determine the appropriate conversation strategy.

Confidence measures have been used in some other types of systems, such as automatic speech recognizers and semantic analyzers. In such systems, either knowledge-based or data-driven features have been used in deriving a confidence measure. Similarly, features from speech recognizers and classification components have been used to derive confidence measures for call routing dialog systems. None of these prior systems have addressed the generation of a confidence measure in a voice search system.

Voice search technology underlies many spoken dialog applications that provide users with information that they request with a spoken query. For example, directory assistance is one of the most popular voice search applications. In directory assistance applications, users issue a spoken query to an automated system which returns phone number and address information for a business or an individual, based on a search conducted using the spoken query.

The characteristics of voice search technology pose some additional problems for spoken dialog systems. A voice search application differs from semantic analysis systems in that it does not require detailed semantic analysis to identify a semantic frame and its slots from an utterance. Similarly, voice search technology differs from call-routing types of applications because in call-routing types of applications, the number of routing destinations is relatively small. By contrast, the inventory of search space, or the number of classification destinations if the search is treated as a classification task, is enormous. Thus, the available data will seldom be sufficient to train a statistical model, such as a maximum entropy classifier or boosting algorithm.

Voice search also differs from speech recognition in that the vocabulary of a voice search system can be much bigger than a typical domain-specific speech recognition application—sometimes reaching millions of lexical entries. In addition, a voice search system must be robust in the face of relatively high automatic speech recognition error rates (sometimes reaching approximately 30-40 percent) and linguistic diversity in user's queries. In other words, users may not know (or would not say) the exact name of an entry in a directory. By way of example, a user looking for a department store may say "ACME Department Store" or "ACME's" rather than the technically correct name of the department store which is "ACME and Company." For these and other reasons, employing a confidence measure in a spoken dialog system employing voice search technology has been very difficult.

The discussion above is merely provided for general background information and is not intended to be used as an aid in determining the scope of the claimed subject matter.

SUMMARY

A method of generating a confidence measure generator is provided for use in a voice search system, the voice search system including voice search components comprising a speech recognition system, a dialog manager and a search system. The method includes selecting voice search features, from a plurality of the voice search components, to be considered by the confidence measure generator in generating a voice search confidence measure. The method includes training a model, using a computer processor, to generate the voice search confidence measure based on selected voice search features.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
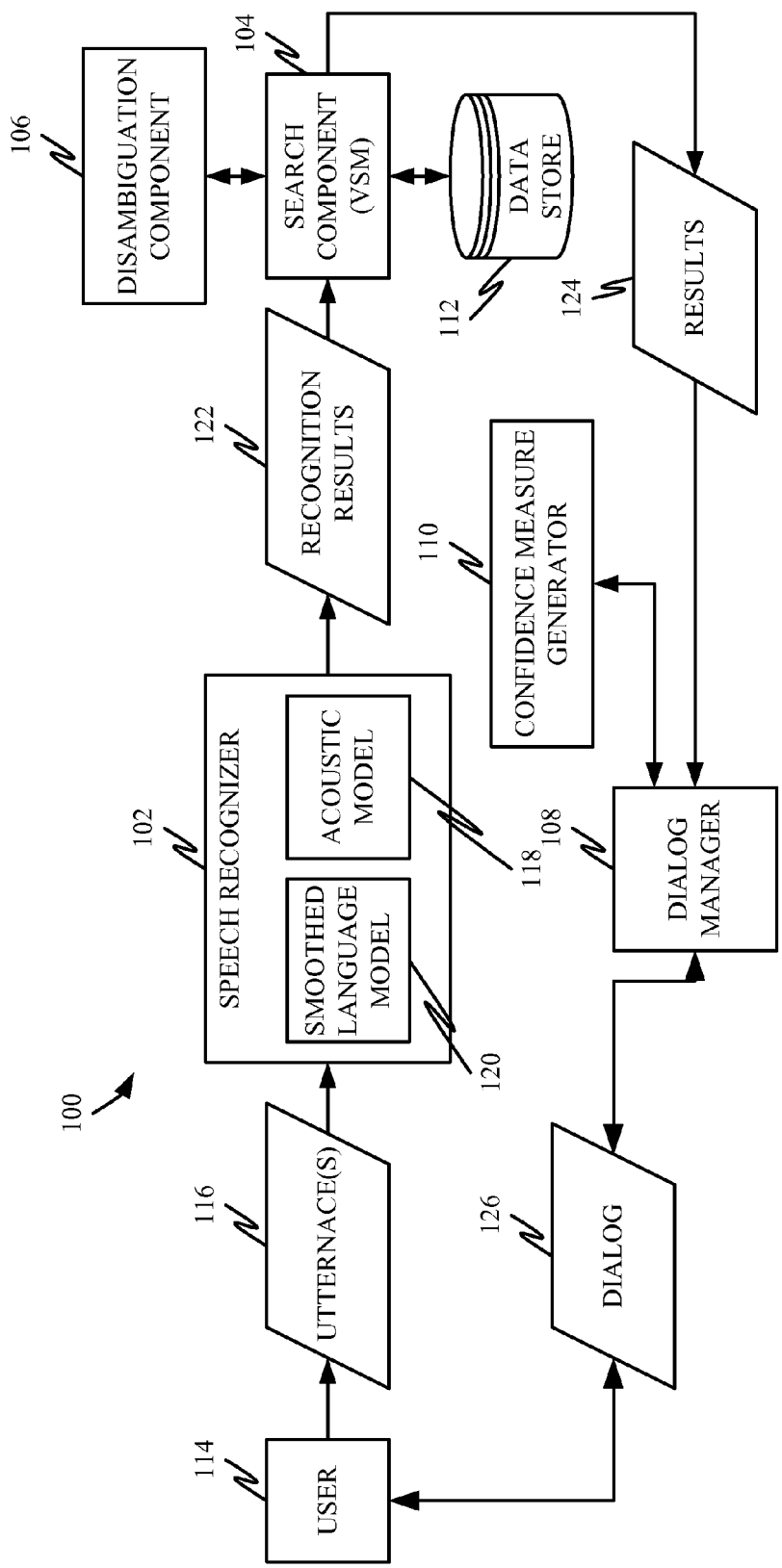
FIG. 1 is a block diagram of one illustrative voice search system.

FIG. 1 is a block diagram of one illustrative embodiment of a voice search system 100. System 100 includes automatic speech recognizer 102, search component 104, disambiguation component 106, dialog manager 108, and confidence measure generator 110. FIG. 1 also shows that search component 104 has access to data store 112.

In voice search system 100, user 114 provides a speech input in the form of one or more utterances 116 to automatic speech recognizer 102. The user 114 will illustratively specify, with utterances 116, what the user is searching for. Speech recognizer 102 illustratively includes an acoustic model 118 and a smoothed language model 120. In one embodiment, acoustic model 118 is known, and models acoustic speech in utterances 116 so that they can be recognized by speech recognizer 102. Language model 120, which is described in greater detail below, is illustratively an n-gram language model that allows speech recognizer 102 to compute the probability of a word given a history of one or more previously recognized words in utterances 116.

Speech recognizer 102 thus recognizes the speech in utterances 116 and converts the user's speech into a query (represented by recognition results 122) in text form. Search component 104 receives the query and executes it against data store 112. In doing so, search component 104 looks for the entries in an inventory of entries in data store 112 that are most similar to the query represented by recognition results 122. By way of example, assume that system 100 is a directory assistance system. In that case, the recognition results 122 will represent a directory listing sought by user 114. Data store 112 illustratively stores an inventory of directory assistance entries, such as businesses. Search component 104 uses the query specifying a requested business and examines data store 112 to identify any entries in data store 112 that match the query.

Search component 104 may illustratively identify a plurality of different entries in data store 112 that sufficiently match the query represented by recognition results 122 to be returned as potential (or candidate) search results. In one embodiment, disambiguation component 106 illustratively reduces the size of the result set. This can be done by using any additional information provided by a user. The reduced result set 124 is provided to dialog manager 108.

Dialog manager 108 controls the flow of the conversation, through a dialog 126, with user 114. In doing this, dialog manager 108 illustratively determines an appropriate conversation strategy with user 114, based on results 124. Confidence measure generator 110 generates a confidence measure, associated with results 124, indicative of how confident system 100 is that results 124 answer the request input by user 114 in the form of utterances 116. For instance, where the confidence in results 124 is not high, dialog manager 108 can determine that it would be best to ask user 114 for further clarification, or disambiguation, etc.

Prior systems used finite state transducers (FSTs) as language models for automatic speech recognition. The FSTs are constructed from the "signatures" of business listing names in a database. Since the output from the FST is the same as the listing names in the database, the spoken language understanding system can be a simple database look up to find the information requested by a user. However, this approach is not robust to linguistic diversity and automatic speech recognition errors.

One embodiment of smoothed language model 120 is now discussed in more detail. In the embodiment shown in FIG. 1, language model 120 is illustratively an n-gram language model trained with database listing names and smoothed with a large vocabulary back-off language model, and search component 104 is illustratively a vector space model (VSM). The two components 120 and 104 will be described in conjunction with one another to enhance understanding.

Vector space models have been used in information retrieval. In that environment, the vector space model represents automatic speech recognition results and listing names as term frequency-inverse document frequency (TF-IDF) weighted vectors. The VSM then identifies the relevant listing (or document) vector with the highest cosine similarity to the vector for the automatic search recognition system result (the query).

Smoothed language model 120 thus increases the robustness of the voice search system to linguistic diversity, and the matching capability of search component (VSM) 104 makes it robust to automatic speech recognition errors and linguistic diversity.

It has been found that the smoothed n-gram language model 120 in conjunction with the vector-based search component 104 (e.g., VSM) significantly outperforms the search approach based on finite state transducers. In a voice search system, the listings in data store 112 are often associated with category information. For instance, where the voice search system is a directory assistance system, the listings in data store 112 may be associated with such category information as "restaurant" or "health care" in a business database. Similarly, the listings may be associated with such category information as "electronics" or "DVDs" in a product database. To further improve search robustness of search component 104, cosine similarity based on listing names is interpolated (or smoothed) with a category similarity measure as follows:

$$\text{sim}(Q,L)=\alpha \cos(Q,L)+(1-\alpha)\cos(Q,C(L)) \qquad \text{Eq. 1}$$

where C(L) is the category of listing L in a database, and it is represented as a vector of a document that contains all of the listing names of that category; and Q represents a user's spoken query.

In smoothing the similarity measure generated by search component 104 in this way, a query such as "ACME Hospital" is more likely to match the listing "ACME Medical Center" than the listing "ACME Café" because the former is of the "healthcare" category and many listings in that category have "hospital" in their names.

Figure 2:
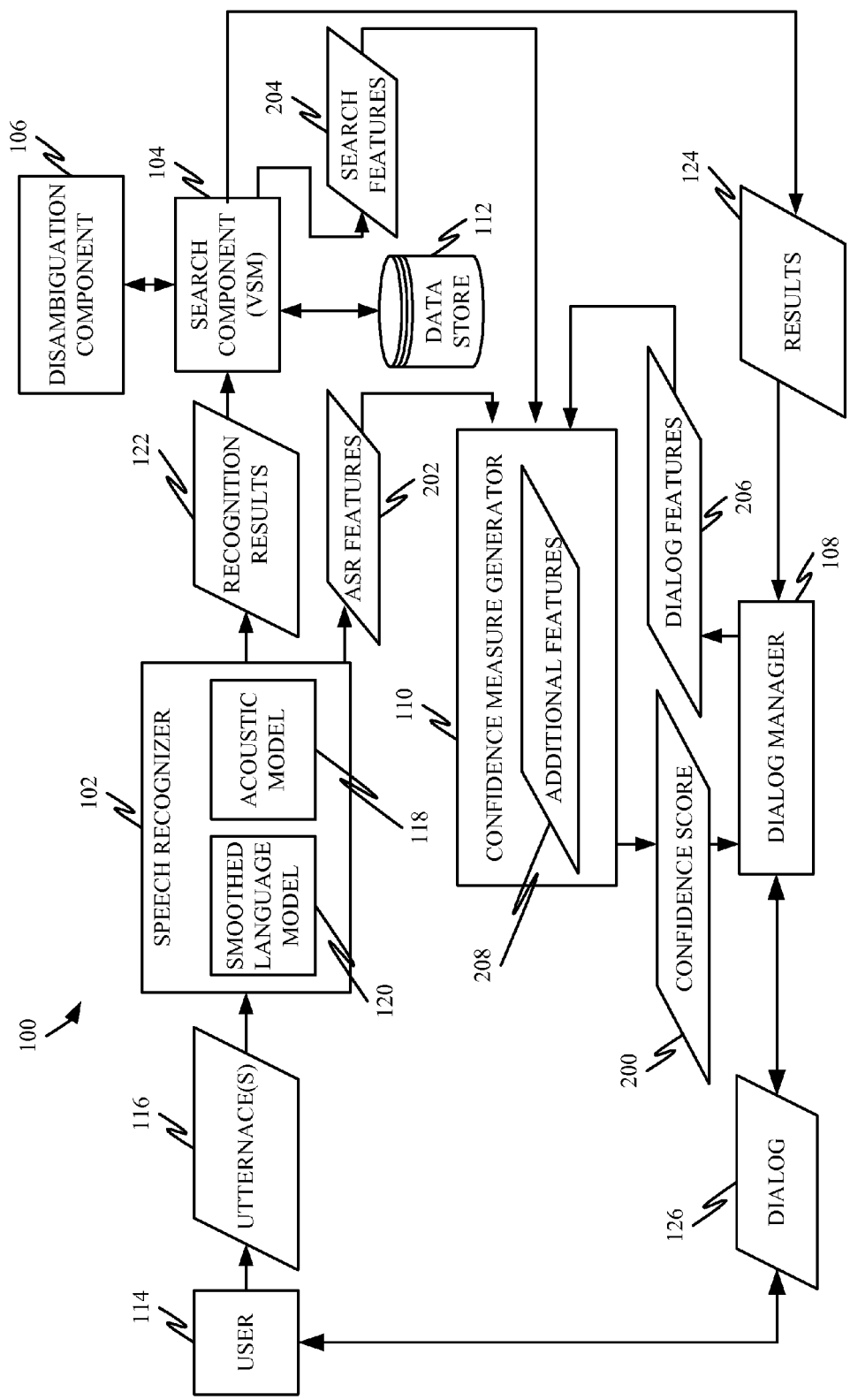
FIG. 2 is a block diagram of the system shown in FIG. 1, incorporating data flow of features used in generating a confidence measure.

FIG. 2 is a more detailed block diagram of system 100, shown in FIG. 1, and it indicates more specific data flow for data used by confidence measure generator 110 in generating a confidence score for results 124. Similar items to those shown in FIG. 1 are similarly numbered.

Given a user's query Q (represented by speech recognition results 122) and the database listing L in data store 112 that is found by search component 104 as an answer to Q, confidence measure generator 110 must generate a confidence score 200 that indicates how likely L is the correct answer to Q, based upon some supporting statistics (or features) collected from the process leading to the finding of L by search component 104. The confidence score 200, which may have a continuous value, can be used by dialog manager 108 to adopt different response strategies, based on different confidence levels, according to a designer's specification.

In one embodiment, confidence measure generator 110 is a binary statistical classifier that assigns a probability to L being "CORRECT" and a probability to L being "INCORRECT". The probability of L being the right class can be used as the confidence score.

Therefore, in one embodiment, confidence measure generator 110 is a maximum entropy classifier that builds a conditional probability distribution P(C|Q,L) from a set of features f, where C is a random variable representing the classification destinations. When modeling the confidence measure, the range of the variable C is [CORRECT, INCORRECT]. Q and L are random variables representing the spoken query (represented by recognition results 122) and the database listing, respectively. A feature f is illustratively a function of C, Q and L. The classifier 110 assigns a distribution P(C|Q,L) that maximizes the conditional entropy H(C|Q,L) from a family of distributions, with a constraint that the expected count of a feature predicted by the conditional distribution is equal to the empirical count of the feature observed in the training data, as follows:

$$\sum_{C,Q,L} \tilde{P}(Q, L) \cdot P(C \mid Q, L) \cdot f_i(C, Q, L) = \qquad \text{Eq. 2}$$

$$\sum_{C,Q,L} \tilde{P}(C, Q, L) \cdot f_i(C, Q, L) \cdot f_i(C, Q, L), \forall\, f_i \in F$$

Where $\tilde{P}$ stands for empirical distributions over a training set, and F is the set of features f.

The maximum entropy distributions that satisfy Eq. 2 above have the following exponential (log-linear) representation:

$$P(C \mid Q, L) = \frac{1}{Z_\lambda(Q, L)} \exp\left(\sum_{f_i \in F} \lambda_i f_i(C, Q, L)\right) \qquad \text{Eq. 3}$$

where $$Z_\lambda(Q, L) = \sum_c \exp\left(\sum_{f_i \in F} \lambda_i f_i(C, Q, L)\right)$$

is a normalization constant;

$\lambda_i$ represents the parameters of the model (and are also known as the weights of features $f_i$), which can be optimized using training data. The maximum entropy model classifier is illustratively trained using a stochastic gradient descent training algorithm, although other training techniques can be used.

In the embodiment shown in FIG. 2, confidence measure generator 110 receives features from a plurality of the different components shown in system 100. For instance, confidence measure generator 110 illustratively receives automatic speech recognition features 202 generated by speech recognizer 102, which are generally indicative of speech recognition accuracy. Similarly, generator 110 illustratively receives search features 204 from search component 104, which are generally indicative of search accuracy, and dialog features 206 from dialog manager 108, which are generally indicative of how well system 100 is performing in responding to user 114. In addition, confidence measure generator 110 can, itself, generate additional features 208 from the features received from the individual components in system 100. All of these features can be used in generating the confidence score 200 associated with results 124. Feature selection, and some particularly helpful features, are discussed below with respect to FIGS. 4-6.

Figure 3:
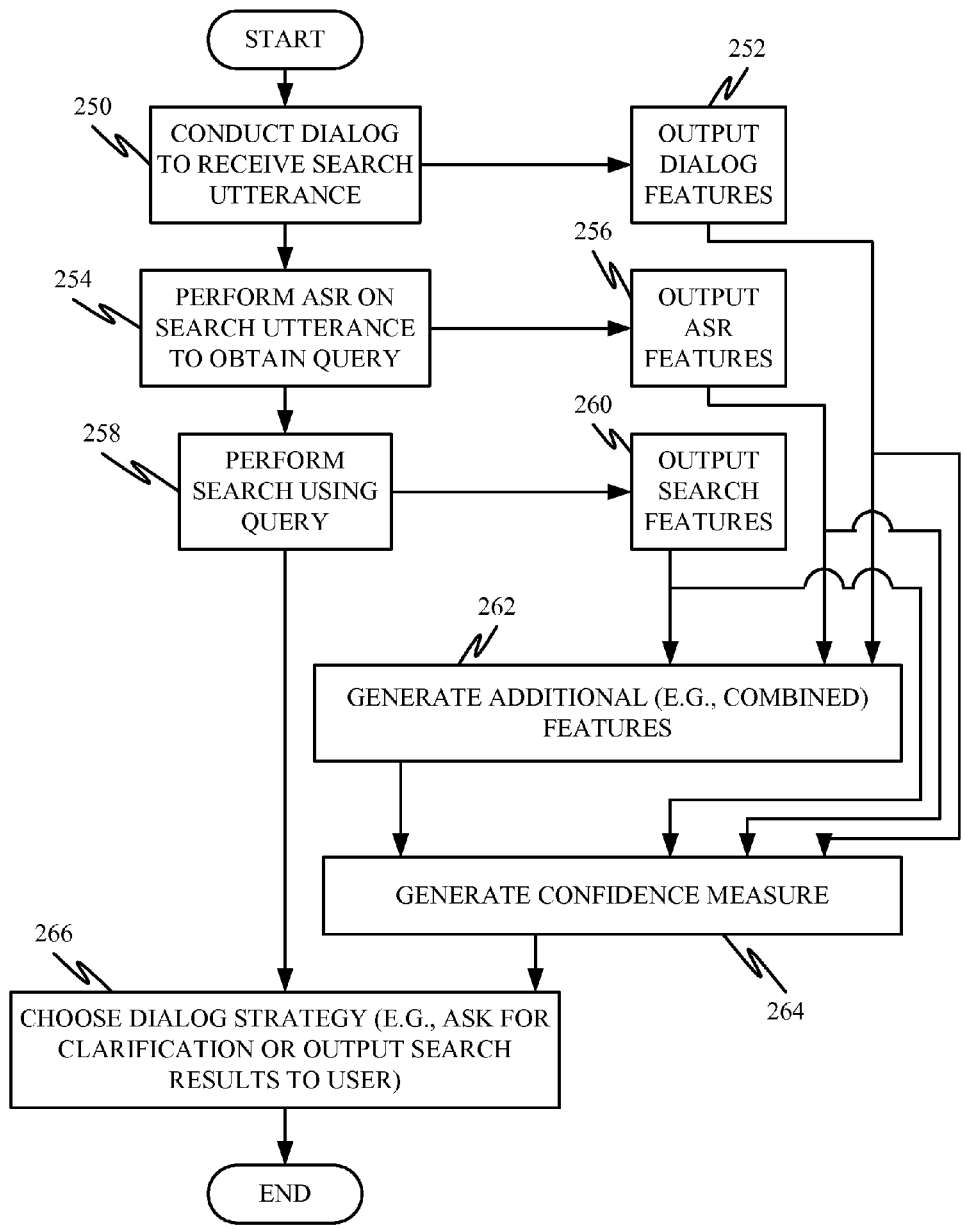
FIG. 3 is a flow diagram illustrating the overall operation of the system shown in FIGS. 1 and 2 in performing a search in generating a confidence measure associated with the search result.

FIG. 3 is a flow diagram illustrating one embodiment of the overall operation of the system shown in FIG. 2. Dialog manager 108 first conducts a dialog 126 with user 114 to receive utterance 116. This is indicated by block 250 in FIG. 3. Dialog manager 108 also illustratively outputs dialog features 206 to confidence measure generator 110. This is indicated by block 252 in FIG. 3. The dialog features 206 can be any of a wide variety of different dialog features, some of which are discussed below. By way of example only, features 206 can illustrate how many dialog turns have been conducted with user 114. In general, when dialog manager 108 is required to conduct a large number of dialog turns with the user, the confidence that system 100 is generating the correct result is reduced.

Once the utterance 116 is received from user 114, speech recognizer 102 performs automatic speech recognition on the utterance to obtain the query (represented by recognition results 122). This is indicated by block 254 in FIG. 3. Speech recognition system 102 also illustratively outputs automatic speech recognition (ASR) features 202 to confidence measure generator 110. This is indicated by block 256 in FIG. 3. The ASR features 202 can also be any of a wide variety of different features, some of which are discussed below.

After the query has been generated, search component 104 searches data store 112 based on the query received. This is indicated by block 258 in FIG. 3. Search component 104 also outputs search features 204 to confidence measure generator 110. This is indicated by block 260 in FIG. 3.

Having received all of the features 202, 204 and 206, confidence measure generator 110 can generate its own additional features 208 as well. This is indicated by block 262 in FIG. 3. Once all of the necessary features are generated, confidence measure generator 110 generates the confidence score corresponding to results 124. This is indicated by block 264 in FIG. 3.

Dialog manager 108 can then chooses a dialog strategy to conduct a further dialog 126 with user 114. For instance, if the confidence measure is relatively low, then dialog manager 108 can choose to ask the user 114 for further clarification, or additional information, which can be used to improve the confidence that system 100 has in the results generated. Alternatively, however, if the confidence measure is relatively high, then dialog manager 108 may simply choose to output results 124 to user 114, either with or without the associated confidence score. Choosing the dialog strategy is indicated by block 266 in FIG. 3.

In one embodiment, the features considered by confidence measure generator 110 can be extracted from each individual component of system 100. Of course, the features can be extracted from fewer components as well, as desired. In the embodiment shown in FIG. 2, the features are extracted from components 102, 104 and 108. Some illustrative candidate features will now be described in more detail, and those discussed are listed in Table 1 below.

TABLE 1

| Features | Err. Rate | P(null) |
|---|---|---|
| All (baseline) | 18.46% | |
| All-City match | 20.47% | 0.11 |
| All-Dialog turn | 20.47% | 0.13 |
| All-Normalized Character Matches | 19.80% | 0.26 |
| All-ASR confidence | 21.48% | 0.02 |
| All-ASR semantic confidence | 20.81% | 0.06 |
| All-Joint ASR confidence/Tf-Idf score | 20.81% | 0.07 |
| All-Covered/uncovered Idf ratio | 19.80% | 0.21 |
| All-Confidence of max Idf word | 19.13% | 0.40 |
| All-Prev turn occurrence | 20.47% | 0.11 |
| All-Tf-Idf gap | 19.80% | 0.21 |
| All-Tf-Idf score (Category) | 20.81% | 0.13 |
| All-Tf-Idf score (No category) | 18.46% | 1.00 |

In one embodiment, ASR features 202 include an ASR confidence feature and ASR semantic confidence features. The ASR confidence feature is the confidence measure generated by speech recognizer 102 based on its recognition of the entire utterance 116. The ASR semantic confidence feature measures the confidence of the speech recognizer 102 only with respect to the semantic content, which is the most semantically important portion of utterance 116. In one embodiment, the semantic content is labeled with semantic tags in a standardized grammar format, although other ways of denoting the semantic content can be used as well.

These two ASR features are generally available from commercially available speech recognizers. However, additional or different ASR features could be used as well. For instance, some speech recognizers output lattice density which corresponds to the density of a recognition lattice generated by the speech recognition component. Other features output by speech recognizer 102 could be used as well.

Search features 204 can also include a wide variety of different features, some of which will now be discussed. Given a query Q and a hypothesized listing L (i.e., the listing in data store 112 with the highest category smoothed vector similarity with Q), the search related features 204 can include the TF-IDF weighted vector similarity between Q and L either with or without category smoothing (or both). These can be labeled TF-IDF score (category) and TF-IDF score (no category), respectively. Features 204 can also include a measure of the gap between the unsmoothed similarity score of L to Q and the highest unsmoothed vector similarity score of any listing to Q. This can be labeled as the TF-IDF gap. This may be greater than zero if the highest unsmoothed score is registered with a listing in data store 112 other than listing L. Another search feature 204 might include a ratio between the maximum IDF value among the words existing in both Q and L (the covered words) and the maximum IDF value among all the words in L (both covered and uncovered words). This can be labeled as the covered/uncovered IDF ratio, and can be helpful because words that are more semantically important in a listing or query tend to have a higher IDF score. Some of the words in the query may be in the listing returned by search component 104, while others may not be. The ratio of the words covered to those not covered tends to indicate whether the most important words in the query are found in the listing. If this ratio is high, it means that a large percentage of the semantically important words in the query were found in the listing.

Search features 204 may also include the number of matching characters in Q and L, normalized by the length of the query and the listing as follows:

$$M^2/|Q||L| \qquad \text{Eq. 4}$$

where M is the number of matching characters, $|Q|$ is the number of characters in Q and $|L|$ is the number of characters in L. This feature can be helpful because the TF-IDF score does not consider word order. In determining the number of matching characters between Q and L, a character-by-character comparison is performed between Q and L to determine the number of matches. Thus, word order is considered. This feature can be referred to as the normalized character matches feature.

Dialog features 206 can also include a wide variety of different features. In one embodiment, the dialog features illustratively include dialog turn, previous turn occurrence, and city match features. The dialog turn feature is an integer that represents the dialog turn at which a spoken query was issued. As mentioned above, the higher the dialog turn, the less confident system 100 is that it is producing an accurate result to the user.

The previous turn occurrence feature is a binary variable that is activated if the listing L returned by search component 104 has been hypothesized and presented to the user in a previous dialog turn by dialog manager 108, and rejected by the user. Of course, if this is the case, then system 100 may not be very confident that this is the correct answer to the current query.

Assuming that system 100 is a directory assistance or similar system, the city match feature may be helpful. The city match feature is an application specific feature and is illustratively activated in a directory assistance system if the city of the hypothesized business listing returned by search component 104 matches the city specified by the user, for instance, at the beginning of a dialog. For example, at the beginning of the dialog, dialog manager 108 may ask the user 114 what city the user is interested in. If the listing in data store 112, returned by search component 104, is from that city, then this feature is activated.

Confidence measure generator 110 can generate additional features 208. The additional features 208 may be different combinations of the features received from the individual components of system 110 and attempt to model the dependency among features across different components in voice search system 100. By way of example only, additional features 208 may illustratively include the ASR confidence generated by speech recognizer 102 on the individual word that also exists in listing L returned by search component 104, and that has the highest IDF value. This feature represents the ASR confidence of the word that contributes the most (semantically) to the search results 124. This feature can be labeled as the confidence of max idf word. Another combined feature can include a combination of the ASR sentence confidence and the smoothed TF-IDF score for the listing. This can be labeled joint ASR confidence/TF-IDF score and can be represented as a value set which is the Cartesian product of the value sets of the two features.

It will also be appreciated that confidence measure generator 110 can be used to generate a confidence score for keyboard text search as well. For instance, because some of the features discussed herein are not speech related (such as the coverage-based features and the character edit distance features) they can be used to generate a confidence measure for keyboard text searches, thus augmenting the system. In that case, user 114 generates an input from a keyboard (such as keyboard 562 shown in FIG. 7 below) and the input is used as a query by search component 104.

Figure 4:
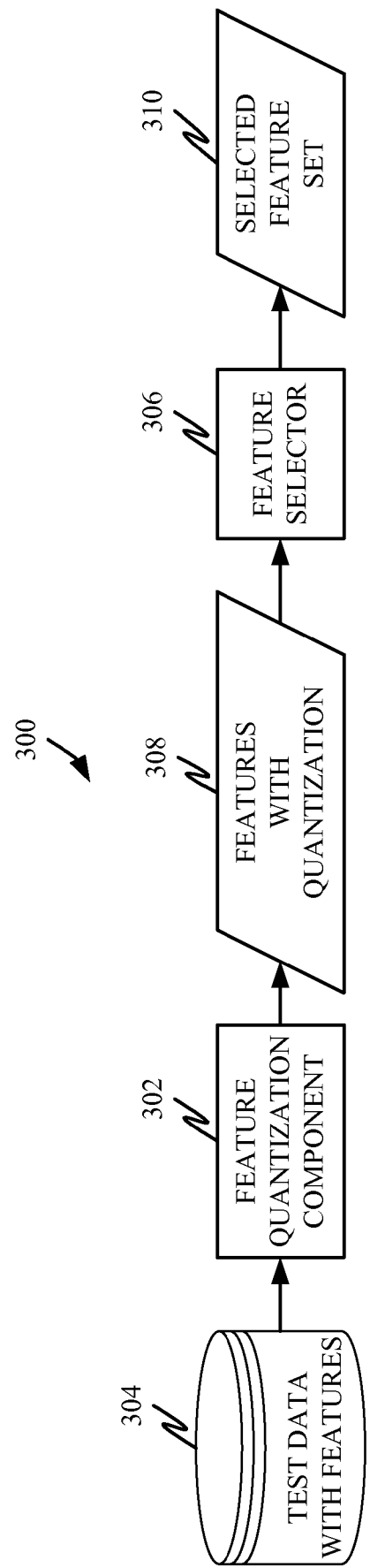
FIG. 4 is a block diagram of one embodiment of a feature selection system.
Figure 5:
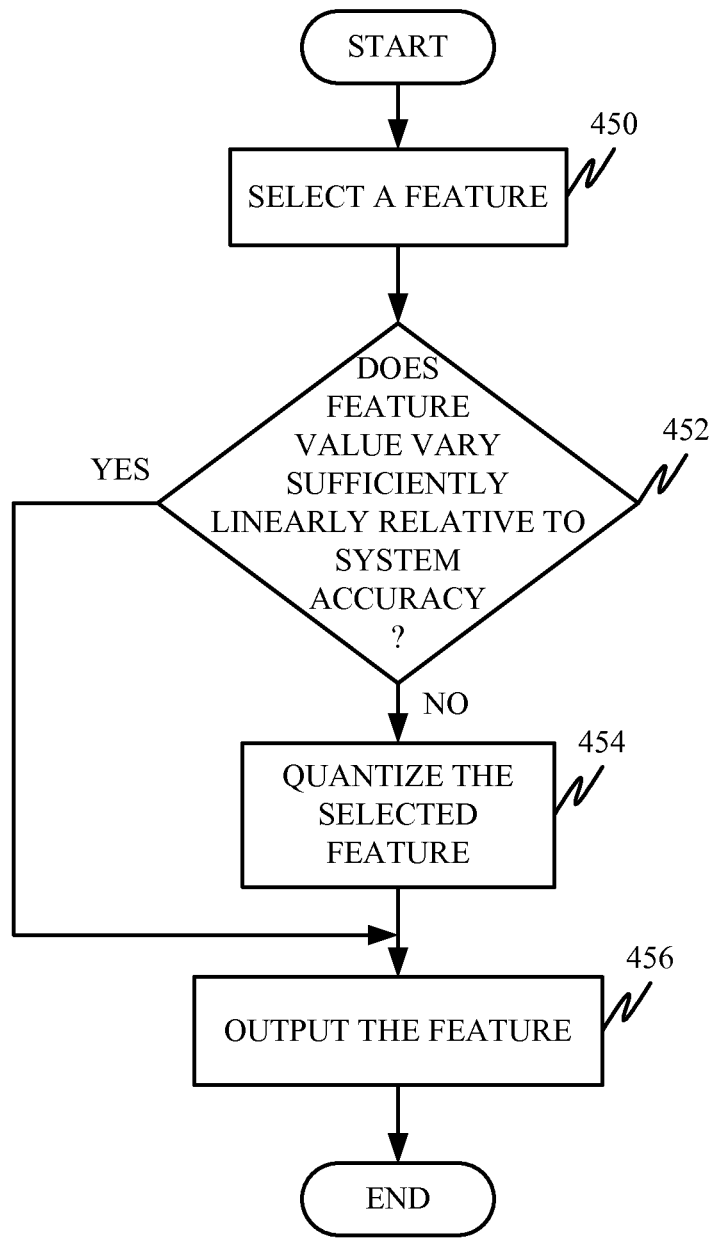
FIG. 5 is a flow diagram illustrating one embodiment of the operation of another portion of the system shown in FIG. 4.
Figure 6:
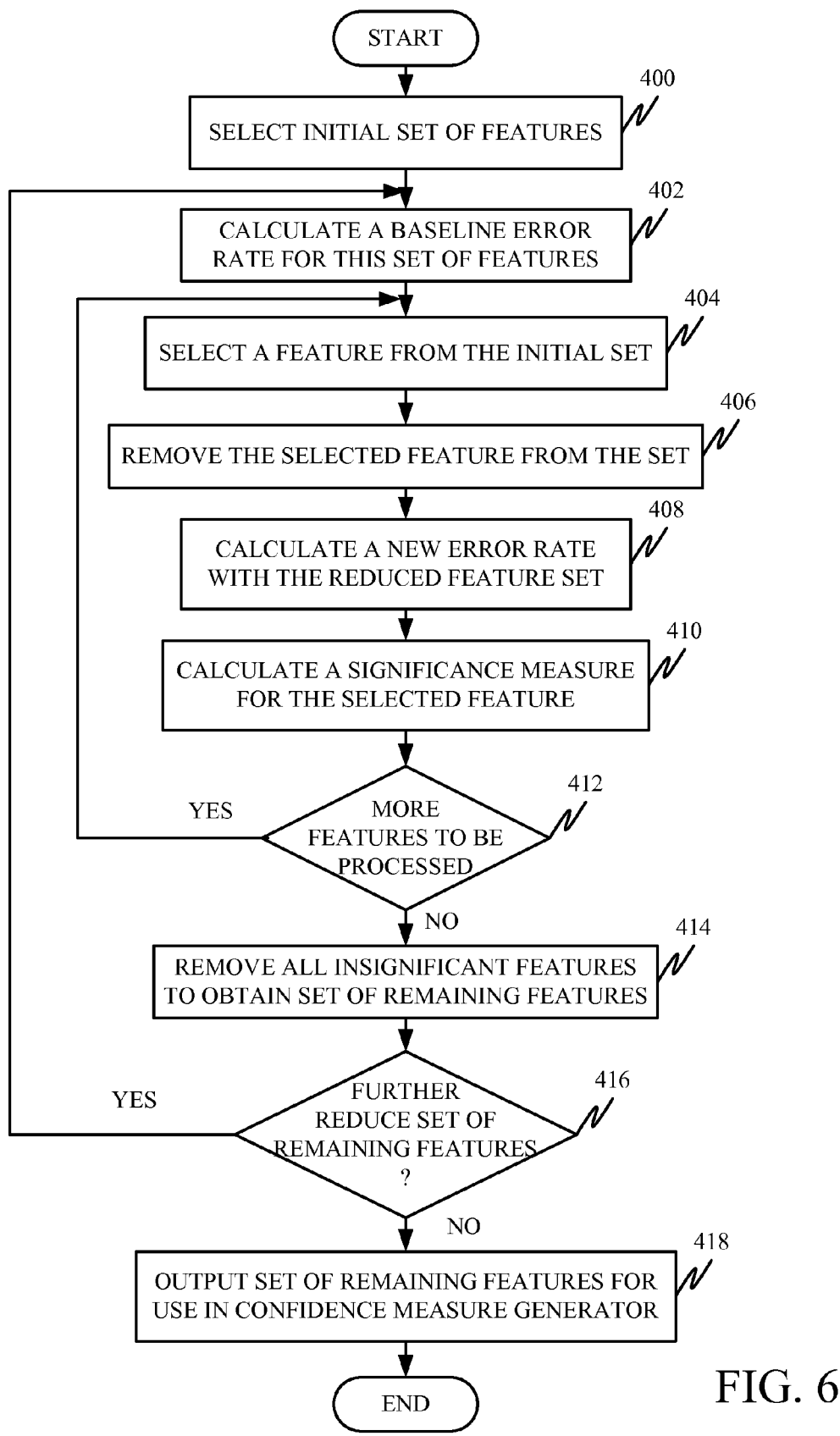
FIG. 6 is a flow diagram illustrating one embodiment of the operation of a portion of the system shown in FIG. 4.

FIG. 4 is a block diagram of one illustrative embodiment of a feature selection system 300 for choosing relevant features from an initial feature set. System 300 includes a feature quantization component 302 that has access to test data with a feature set stored in a data store 304, and that quantizes at least some features to obtain features with quantization 308. System 300 also illustratively includes a feature selector 306 that selects some of the quantized features for use in system 100. FIG. 5 is a flow diagram illustrating one embodiment of the overall operation of feature quantization component 302 in quantizing certain features in the feature set in store 304 to obtain features 308. FIG. 6 is a flow diagram illustrating one embodiment of the overall operation of feature selector 306 in selecting a quantized feature set 310. FIGS. 4-6 will now be described in conjunction with one another.

Many features in the feature set in store 304 have continuous values. Many classifiers, however, such as the maximum entropy classifier illustratively used for confidence measure generator 110, can process continuous features, but are configured to assume a linear relation between feature values and the class boundary. This assumption is seldom valid, especially in the particular features being discussed herein. In fact, by plotting the end-to-end accuracy of system 100 versus feature values in an exemplary directory assistance system, it was seen that many of the features vary in a substantially non-linear way. Therefore, in one embodiment, system 300 includes feature quantization component 302 that quantizes at least some of the features in the feature set in store 304.

FIG. 5 is a flow diagram illustrating one embodiment of the overall operation of feature quantization component 302. Feature quantization component 302 first selects a feature from the feature set in store 304. This is indicated by block 450 in FIG. 5. Feature quantization component 302 then calculates whether the selected feature value varies in a sufficiently linear manner relative to the overall end-to-end system accuracy. This is indicated by block 452. This can be done simply by computing the system accuracy and plotting it relative to the feature value, or the linearity data can be input to the system separately, as desired. The measure of linearity can also be set, empirically, or otherwise as desired. In any case, if feature quantization component 302 determines that the selected feature varies sufficiently linearly, then the feature is simply output, as indicated by block 456 in FIG. 5. Otherwise, the feature is quantized as indicated by block 454 in FIG. 5. The result is features with quantization 308.

Quantization can be done in a variety of different ways, of course. In one embodiment, the features are quantized into 20 evenly distributed discrete buckets. Each bucket being represented by a binary random variable that has value 1 if a continuous feature falls into the bucket and 0 otherwise. Of course, any of a variety of other quantization schemes can be used as well.

In order to select certain features from features 308 for use in performing voice search, feature selector 306 selects an initial set of features from quantized features 308. This is indicated by block 400 in FIG. 6. In one embodiment, the initial feature set selected by feature selector 306 includes those features discussed above as features 202, 204, 206 and 208 in addition to baseline error rate statistics. The baseline error rate indicates the accuracy of the classifier 110 in generating the appropriate response [CORRECT or INCORRECT] using all of the features discussed above. Table 1 shows all of the features, including the baseline, in the initial feature set selected by selector 306. Calculating the baseline error rate is indicated by block 402.

Next, from the initial feature set, feature selector 306 selects one of the features. This is indicated by block 404 in FIG. 6. The selected feature is then removed from the set of features used by confidence measure generator 110 to generate a confidence measure. Removing the selected features is indicated by block 406. With the selected feature removed, feature selector 306 calculates a new error rate with this reduced feature set (with the selected feature removed from consideration). Calculating the new error rate is indicated by block 408 in FIG. 6. Feature selector 306 then determines how significant the selected feature is in the overall error rate for classifying the result 124 generated by system 100 as CORRECT or INCORRECT. This is indicated by block 410 in FIG. 6. In other words, if the error rate of confidence measure generator 110 does not significantly change, with the selected feature removed from the considered feature set, then removing the feature will have relatively little affect on the accuracy of generator 110, and it can be removed from consideration.

Table 1 shows the significance indicator as P(null). The P(null) value represents the probability of a null hypothesis after the removal of the selected individual feature. Therefore, the higher the value of P(null) the less significant the feature to the error rate of generator 110. It can be seen from Table 1 that the removal of the TF-IDF score without category smoothing (No Category) feature is insignificant. In fact, since P(null) has a value of 1.00 for that feature, there is no change, whatsoever, in the error rate of generator 110, with that feature removed.

As indicated by block 412 in FIG. 6, feature selector 306 selects each of the features in the initial feature set and calculates the value of P(null) as discussed above. The results of the exemplary features in the initial feature set with P(null) calculated by feature selector 306 is also shown in Table 1. Feature selector 306 simply continues to select a feature and calculate P(null) for the selected feature until all features have been selected and removed from consideration in system 100. Once P(null) has been calculated for each feature, those that do not meet a desired threshold level of significance can be removed from consideration. This is indicated by block 414 in FIG. 6.

In one embodiment, removal of features that do not meet a threshold level of significance can be performed in a plurality of different passes. Therefore, for instance, at block 414, the TF-IDF score (no category) feature might be removed from the initial feature set. Then, at block 416, feature selector 306 may choose to further reduce the feature set, and processing then continues at block 402, accept that the initial feature set and baseline error rate are calculated without considering the TF-IDF score (no category) feature which has already been removed during the first pass.

Table 2 shows the set of features with P(null) calculated for each feature, after the TF-IDF score (no category) feature has been removed from consideration.

TABLE 2

| Features | Err. Rate | P(null) |
| --- | --- | --- |
| Base = All − Tf-Idf score (No Category) | 18.46% | |
| Base-City match | 18.46% | 1.00 |
| Base-Dialog turn | 17.79% | 0.86 |
| Base-Normalized character matches | 19.13% | 0.41 |
| Base-ASR confidence | 18.79% | 0.50 |
| Base-ASR semantic confidence | 20.81% | 0.03 |
| Base-Joint ASR confidence/Tf-Idf score | 18.46% | 0.64 |
| Base-Covered/uncovered Idf ratio | 18.46% | 0.75 |
| Base-Confidence on max Idf word | 19.46% | 0.25 |
| Base-Prev turn occurrence | 18.46% | 1.00 |
| Base-Tf-Idf gap | 19.80% | 0.11 |
| Base-Tf-Idf score (Category) | 19.13% | 0.43 |

It can be seen that both the error rate and the value of P(null) change significantly when the process of blocks 402-414 is repeated without considering the TF-IDF score (no category) feature. Thus, an additional set of insignificant features can be removed from the set of features under consideration, at block 414 in FIG. 6, after the second pass. In one embodiment, during the second pass, if the value of P(null) for a given feature exceeds 0.5, then that feature is removed. Of course, the threshold can be set to any desired level. By way of example, removing those features having P(null) value in excess of 0.5 after the second pass leaves a set of five features considered by confidence measure generator 110, as follows:

Normalized character matches;
ASR semantic confidence;
Confidence on max IDF word;
TF-IDF gap; and
IF-IDF score (Category).

This final set of features can be output by feature selector 306 as the selected feature set 310 (shown in FIG. 4). This is indicated by block 418 in FIG. 6.

Figure 7:
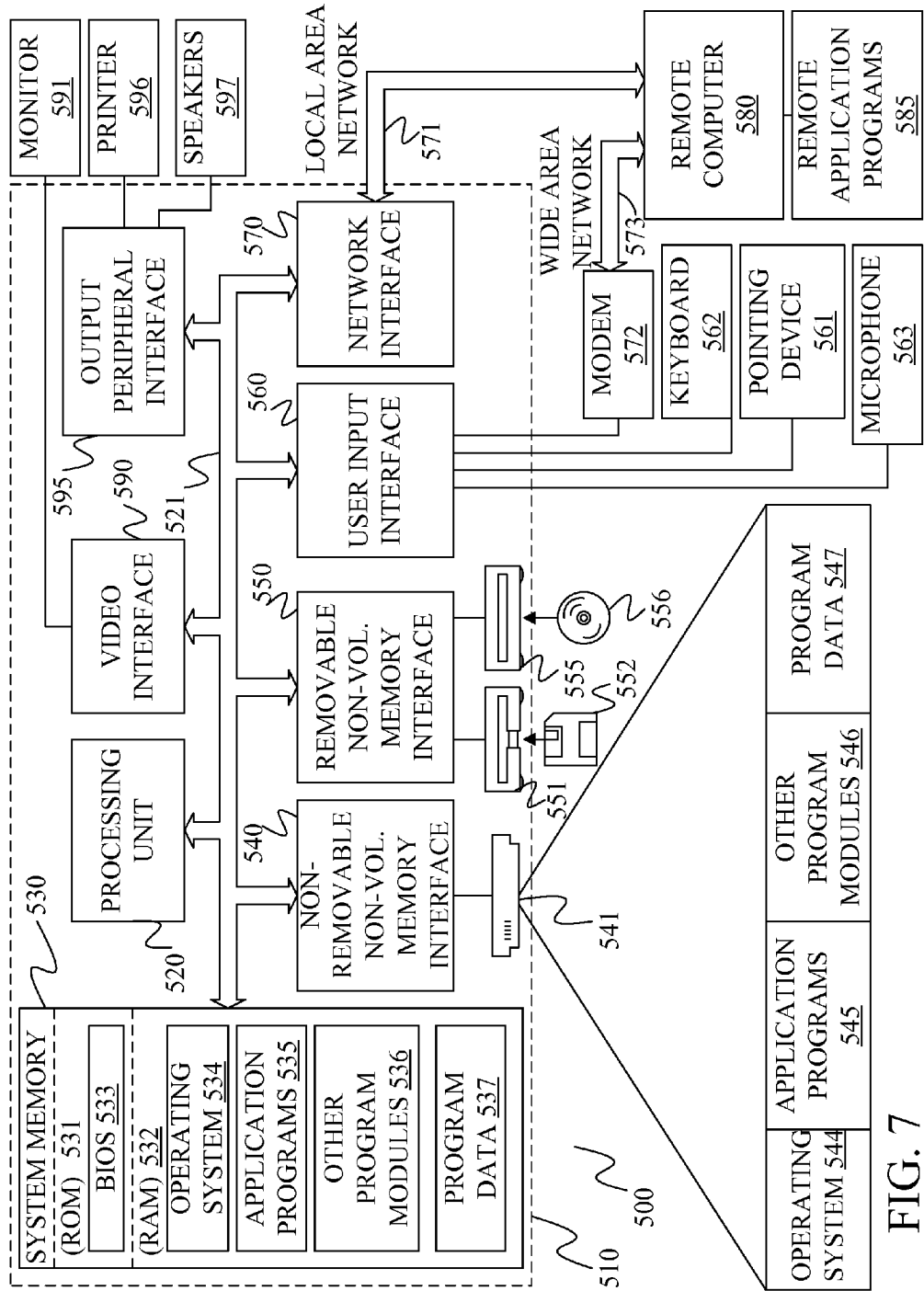
FIG. 7 is a block diagram of one illustrative computing environment.

FIG. 7 illustrates an example of a suitable computing system environment 500 on which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 7 illustrates operating system 534, application programs 535, other program modules 536, and program data 537. Systems 100 and 300 can be used in other program modules 536, or at another desired location.

The computer 510 may also include other removable/non-removable volatile/nonvolatile computer storage media. By way of example only, FIG. 7 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 7, provide storage of computer readable instructions, data structures, program modules and other data for the computer 510. In FIG. 7, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 7 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 7 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of generating a confidence measure generator for use in a voice search system, the voice search system including voice search components comprising a speech recognition system, a dialog manager and a search system, the method comprising:
    identifying initial voice search features from the voice search components, the initial voice search features comprising a first feature from the speech recognition system indicative of accuracy in recognizing an utterance to generate a query, a second feature from the search system indicative of accuracy in searching for results based on the query, and a third feature from the dialog manager indicative of characteristics of user dialog turns conducted in obtaining the utterance;
    determining a significance measure for each of the initial voice search features;
    selecting a set of voice search features from the initial voice search features, based on the determined significance measures, to be considered by the confidence measure generator in generating a voice search confidence measure indicative of a confidence that a search result answers a request input by a user; and
    training a model, using a computer processor, to generate the voice search confidence measure based on the selected set of voice search features.

2. The method of claim 1, wherein selecting the set of voice search features comprises:
    calculating an error rate for the model based on the set of features;
    identifying insignificant features in the set of features; and
    removing the insignificant features from the set of features to obtain a set of remaining features.

3. The method of claim 2, wherein selecting the set of voice search features further comprises:
    repeating the steps of calculating an error rate for the model based on the set of features, identifying insignificant features in the set of features, and removing the insignificant features from the set of features to obtain a set of remaining features, until a desired set of remaining features is obtained.

4. The method of claim 3, wherein identifying insignificant features comprises:
    calculating how much each feature in the set of features affects the error rate of the model; and
    identifying, as insignificant features, those features in the set of features that affect the error rate of the model less than a threshold amount.

5. The method o of features affects f claim 4, wherein calculating how much each feature in the set the error rate of the model comprises:
    selecting a feature from the set of features; and
    calculating an error rate of the model without considering the selected feature.

6. The method of claim 2, wherein selecting voice search features further comprises:
    determining whether each feature in the set of remaining features varies sufficiently linearly with respect to an error rate of the voice search system; and
    for each given feature that does not vary sufficiently linearly, quantizing the given feature.

7. The method of claim 6, wherein determining whether each feature in the set of remaining features varies sufficiently linearly with respect to an error rate of the voice search system, comprises:
    selecting a feature from the set of remaining features;
    calculating voice search system error rate relative to a value of the selected feature; and
    calculating a linearity measure indicative of a linearity of the selected feature.

8. The method of claim 1, wherein selecting voice features comprises:
    selecting combined voice features based on combinations of the voice search features from the voice search components.

9. A computer readable storage medium storing instructions, which, when executed by a computer, perform steps that generate a confidence measure generator for use in a voice search system, the voice search system including a plurality of different voice search components comprising at least a speech recognition system that recognizes a user speech input, a dialog manager that controls a user dialog, and a search system that searches a data store based on a query, the steps comprising:
    identifying a plurality of voice search features from the voice search components comprising at least two of:
        a speech recognition feature from the speech recognition system indicative of speech recognition accuracy in recognizing the user speech input to generate the query,
        a dialog feature from the dialog manager indicative of characteristics of dialog turns conducted by the voice search system with a user in obtaining the user speech input, and
        a search feature from the search system indicative of search accuracy in searching for results based on the query;

selecting a set of voice search features, from the plurality of the voice search features, to be considered by the confidence measure generator in generating a voice search confidence measure; and training a model to generate the voice search confidence measure based on selected voice search features.

10. The computer readable storage medium of claim 9, wherein selecting voice search features comprises:
    calculating an error rate for the model based on the set of features;
    identifying insignificant features in the set of features; and
    removing the insignificant features from the set of features to obtain a set of remaining features.

11. The computer readable storage medium of claim 10, wherein selecting voice search features further comprises:
    repeating the steps of selecting a set of features, calculating an error rate for the model based on the set of features, identifying insignificant features in the set of features, and removing the insignificant features from the initial set of features to obtain a set of remaining features, until a desired set of remaining features is obtained.

12. The computer readable storage medium of claim 11, wherein identifying insignificant features comprises:
    calculating how much each feature in the set of features affects the error rate of the model; and
    identifying, as insignificant features, those features in the set of features that affect the error rate of the model less than a threshold amount.

13. The computer readable storage medium of claim 12, wherein calculating how much each feature in the set of features affects the error rate of the model comprises:
    selecting a feature from the set of features; and
    calculating an error rate of the model without considering the selected feature.

14. The computer readable storage medium of claim 10, wherein selecting voice search features further comprises:
    determining whether each feature in the set of remaining features varies sufficiently linearly with respect to an error rate of the voice search system; and
    for each given feature that does not vary sufficiently linearly, quantizing the given feature.

15. The computer readable storage medium of claim 14, wherein determining whether each feature in the set of remaining features varies sufficiently linearly with respect to an error rate of the voice search system, comprises:
    selecting a feature from the set of remaining features;
    calculating voice search system error rate relative to a value of the selected feature; and
    calculating linearity measure indicative of a linearity of the selected feature.

16. The computer readable storage medium of claim 9, wherein selecting voice features comprises:
    selecting combined voice features based on combinations of the voice search features from the voice search components.

17. A method of generating a confidence measure generator for use in a voice search system, the voice search system including voice search components comprising a speech recognition system, a dialog manager and a search system, the method comprising:
    selecting an initial set of voice search features, from a plurality of the voice search components;
    training a model, using the initial set of voice search features, to generate a voice search confidence measure indicative of a confidence that a search result answers a request input by a user;
    calculating a baseline error rate for the trained model;
    selecting a voice search feature from the initial set;
    obtaining a reduced feature set by removing the selected voice search feature from the initial set;
    calculating a new error rate for the reduced feature set;
    identifying the selected voice search feature as an insignificant feature based on a difference between the baseline error rate and the new error rate being less than a threshold amount;
    removing the insignificant feature from the initial set of features to obtain a set of remaining features; and
    retraining the model, using a computer processor, to generate the voice search confidence measure based on the set of remaining features.

18. The method of claim 17, wherein calculating the new error rate comprises calculating a model error ate without considering the selected feature.

19. The method of claim 17, wherein selecting voice search features further comprises:
    determining whether each feature in the set of remaining features varies sufficiently linearly with respect to an error rate of the voice search system; and
    for each given feature that does not vary sufficiently linearly, quantizing the given feature.

20. The method of claim 19, wherein determining whether each feature in the set of remaining features varies sufficiently linearly with respect to an error rate of the voice search system, comprises:
    selecting a feature from the set of remaining features;
    calculating voice search system error rate relative to a value of the selected feature; and
    calculating a linearity measure indicative of a linearity of the selected feature.

* * * * *